United States Patent
Zhao et al.

(10) Patent No.: US 12,529,942 B2
(45) Date of Patent: Jan. 20, 2026

(54) DETECTION DEVICE AND DETECTION METHOD FOR CAMERA MODULE

(71) Applicant: TRIPLE WIN TECHNOLOGY (SHENZHEN) CO. LTD., Shenzhen (CN)

(72) Inventors: Ying-Quan Zhao, Shenzhen (CN); Cheng-An Lin, New Taipei (TW); Yu-Tsang Tu, New Taipei (TW)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 182 days.

(21) Appl. No.: 18/241,493

(22) Filed: Sep. 1, 2023

(65) Prior Publication Data
US 2024/0361673 A1 Oct. 31, 2024

(30) Foreign Application Priority Data
Apr. 28, 2023 (CN) .......................... 202310487488.4

(51) Int. Cl.
*G03B 17/02* (2021.01)
*F16M 11/42* (2006.01)
*G03B 17/18* (2021.01)
*G03B 17/56* (2021.01)

(52) U.S. Cl.
CPC ............ *G03B 17/02* (2013.01); *F16M 11/42* (2013.01); *G03B 17/18* (2013.01); *G03B 17/561* (2013.01)

(58) Field of Classification Search
CPC ...... G03B 43/00; G01R 31/2834; H04M 1/24
See application file for complete search history.

(56) References Cited

U.S. PATENT DOCUMENTS

| | | | |
|---|---|---|---|
| 2004/0211058 A1* | 10/2004 | Hansson | H01F 41/09 29/601 |
| 2007/0206967 A1* | 9/2007 | Kikuchi | H04N 17/002 348/E17.002 |
| 2013/0311318 A1* | 11/2013 | Librizzi | G06Q 10/00 705/308 |
| 2016/0192213 A1* | 6/2016 | Diperna | H04W 4/02 455/425 |
| 2020/0141973 A1* | 5/2020 | Hong | H04N 23/54 |

* cited by examiner

*Primary Examiner* — Noam Reisner
(74) *Attorney, Agent, or Firm* — ScienBiziP, P.C.

(57) ABSTRACT

A detection device and a method for detecting a camera module of a product are provided. The first detection assembly includes a first platform, a turntable, and first detection members. The turntable rotatably is provided with first detection positions. The first detection members are connected to the first platform and surround the turntable. Each first detection position can support the second surface of the product to cause the camera module to face a corresponding first detection member. The turntable rotates the product to cause the camera module to face the next first detection member. The second detection assembly includes a second platform, a fixing table, and a second detection member. The fixing table is provided with a second detection position supporting the first surface of the product to cause the camera module to face the second detection member. The rotation assembly rotates the product detected by the first detection members.

18 Claims, 3 Drawing Sheets

DETECTION DEVICE AND DETECTION METHOD FOR CAMERA MODULE

FIELD

The subject matter relates to optical imaging, and more particularly, to a detection device and a detection method for a camera module.

BACKGROUND

Electronic devices, such as mobile phones and tablet computers, may have camera modules. During the manufacture of the electronic device, the camera module needs to undergo multiple detection processes. However, the detection efficiency is low.

Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
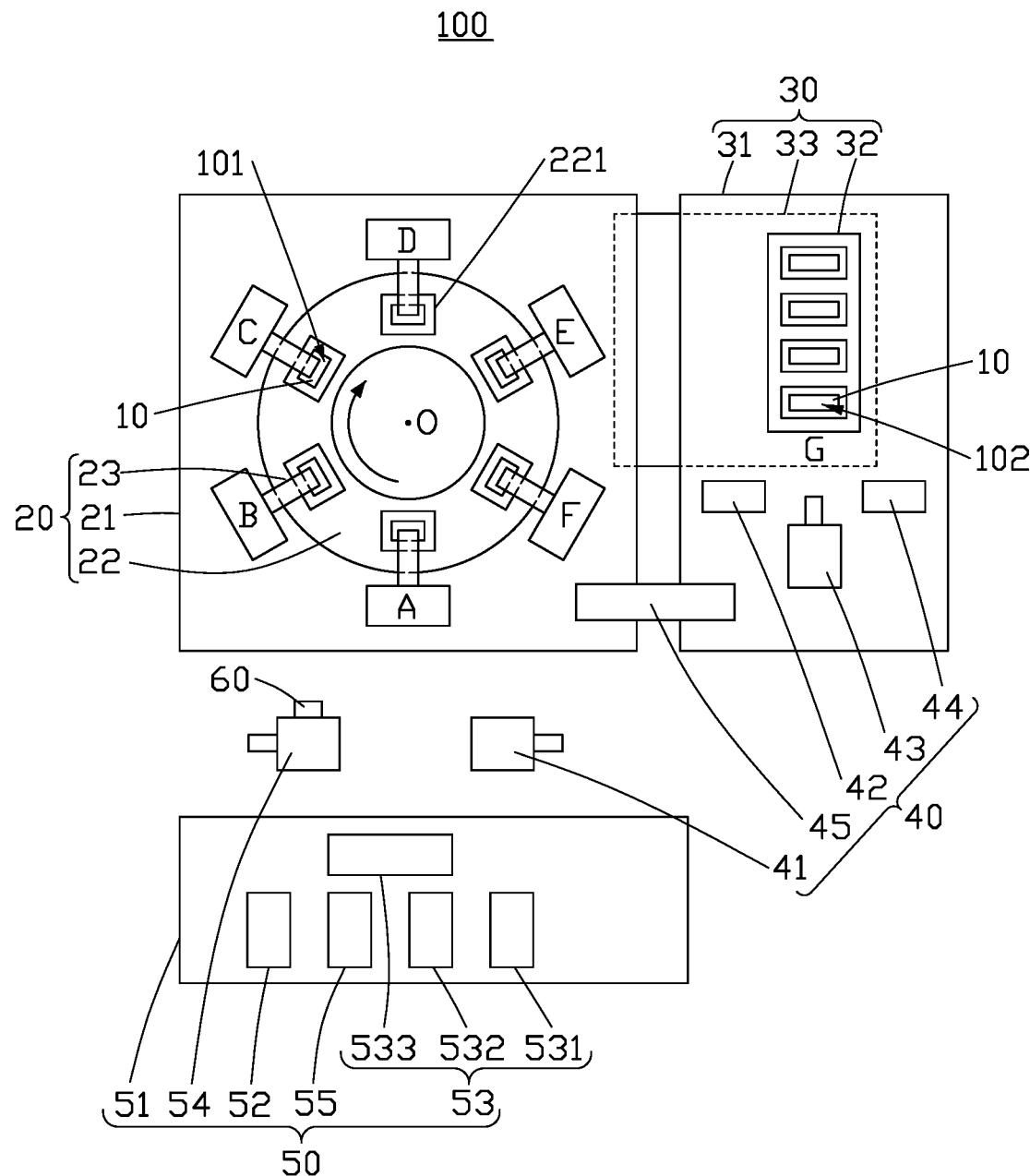
FIG. 1 is a top diagrammatic view of a detection device according to an embodiment of the present disclosure.

It will be appreciated that for simplicity and clarity of illustration, where appropriate, reference numerals have been repeated among the different FIGS. to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, a detection device 100 is provided according to an embodiment of the present disclosure. The detection device 100 is used to detect a camera module (not shown) of the product 10. The product 10 includes a first surface 101 and a second surface 102 opposite to the first surface 101, and the camera module is exposed from the first surface 101. The product 10 may be, but is not limited to, a mobile phone.

The detection device 100 includes a first detection assembly 20, a second detection assembly 30, and a rotation assembly 40. Each of the first detection assembly 20 and the second detection assembly 30 is used to successively detect the camera module of the product 10. The rotation assembly 40 may be located between the first detection assembly 20 and the second detection assembly 30. The rotation assembly 40 is used to receive the product 10 that has been detected by the first detection assembly 20, rotate the product 10 by 180 degrees, and then transmit the rotated product 10 to the second detection assembly 30.

Figure 2:
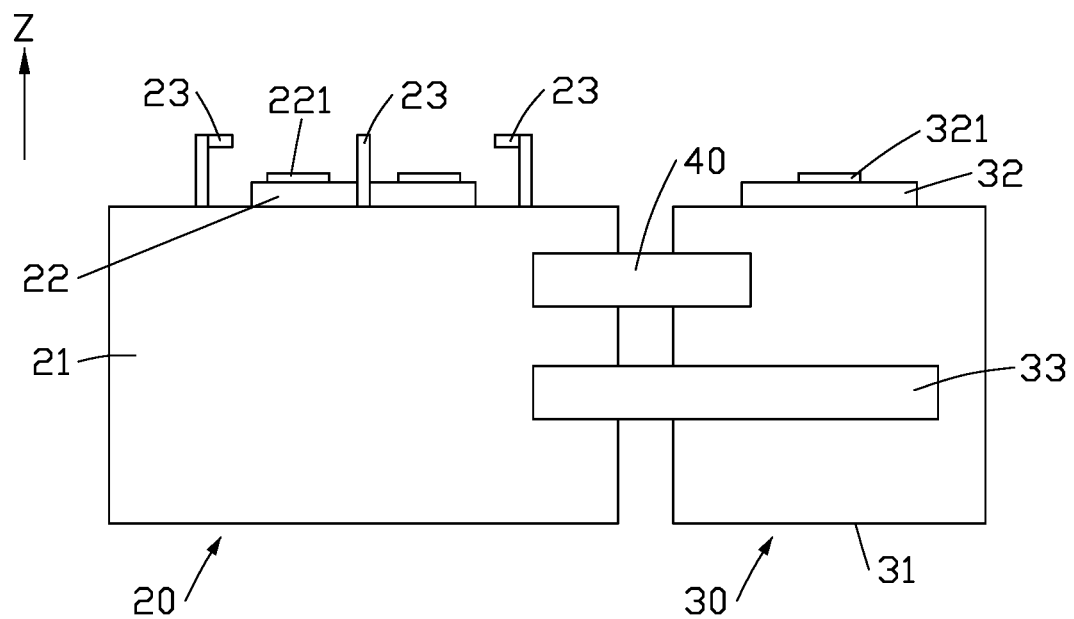
FIG. 2 is a side diagrammatic view of a first detection assembly and a second detection assembly of the detection device of FIG. 1.

Referring to FIGS. 1 and 2, the first detection assembly 20 includes a first platform 21, a turntable 22, and multiple first detection members 23. The turntable 22 is located on and rotatably connected to the first platform 21. The turntable 22 is provided with multiple first detection positions 221 spaced from each other. The first detection members 23 are all connected to the first platform 21 and surround the periphery the turntable 22. Each of the first detection positions 221 is used to support the second surface 102 of the product 10 to cause the camera module to face one of the first detection members 23. The turntable 22 is used to drive the product 10 to successively face the first detection members 23, so that the first detection members 23 can successively detect the camera module. In at least one embodiment, each of the first detection members 23 may include a light source for emitting light toward the camera module. The light may pass through the lens of the camera module and then be received by an image sensor. By analyzing the image formed in the image sensor, the parameter of the camera module can be obtained. In at least one embodiment, a fixing component (not shown) may be arranged on each first detection position 221 to fix the product 10 on the first detection position 221, thereby preventing the product 10 from separating from the turntable 22 during the rotation of the turntable 22. The fixing component may be a clamping fixture or a sucker.

In at least one embodiment, the first detection positions 221 are spaced from each other by a same distance around the axis O of the turntable 22. The first detection positions 221 corresponds one-to-one with the first detection members 23, so that an angle between the adjacent two first detection members 23 is the same as an angle between the adjacent two first detection positions 221. When the turntable 22 drives the product 10 on the first detection position 221 to move to correspond to one of the first detection members 23, the remaining first detection positions 221 respectively correspond to the remaining first detection members 23. Thus, multiple products 10 can be placed on the first detection positions 221 to improve the detection efficiency.

In at least one embodiment, six first detection positions 23 and six first detection positions 221 are included. The six first detection positions 23 are used to detect different parameters of the camera module, so the present disclosure denotes the first detection members 23 by characters A, B, C, D, E, and F in the figures. The first detection members A, B, C, D, E, and F are successively arranged along a rotation direction of the turntable 22. The above parameters of the camera module may include a first parameter related to the electrical conduction detection, a second parameter related to the voice coil motor (VCM) curve detection, a third parameter related to focusing or dark environment detection at an infinite position, a fourth parameter related to the close-range focusing detection, a fifth parameter related to detection under light source with a 5000K color temperature, and a sixth parameter related to detection under light source with a the 2800K color temperature. In the embodiment, the angle between adjacent two first detection members 23 is 60 degrees, and the angle between adjacent two first detection positions 221 is also 60 degrees. In other embodiments, the number of the first detection members 23 may be varied according to needs, and the number of the first detection position 221 may also be varied accordingly.

Since six first detection positions 221 are included in the embodiment, six fixing components are also included accordingly. The six fixing components include a first fixing component, a second fixing component, a third fixing component, a fourth fixing component, a fifth fixing component, and a sixth fixing component. In operation, the first detection assembly 20 detects the product 10 based on a detection process as follows.

A first product 10 to be tested is placed on the first fixing component on the turntable 22, and the first detection member A detects the first parameter of the camera module of the first product 10.

After the above detection is completed, the turntable 22 rotates about 60 degrees for the first time, and a second product 10 to be tested is placed on the second fixing component on the turntable 22. The first detection member A detects the first parameter of the camera module of the second product 10. At this time, the camera module of the first product 10 faces the first detection member B, and the first detection member B detects the second parameter of the camera module of the first product 10.

After the above detection is completed, the turntable 22 rotates about 60 degrees for the second time, and a third product 10 to be tested is placed on the third fixing component on the turntable 22. The first detection member A detects the first parameter of the camera module of the third product 10. At this time, the camera module of the first product 10 faces the first detection member C, and the first detection member C detects the third parameter of the camera module of the first product 10. Also, the camera module of the second product 10 faces the first detection member B, and the first detection member B detects the second parameter of the camera module of the second product 10.

After the above detection is completed, the turntable 22 rotates about 60 degrees for the third time, and a fourth product 10 to be tested is placed on the fourth fixing component on the turntable 22. The first detection member A detects the first parameter of the camera module of the fourth product 10. At this time, the camera module of the first product 10 faces the first detection member D, and the first detection member D detects the fourth parameter of the camera module of the first product 10. Also, the camera module of the second product 10 faces the first detection member C, and the first detection member C detects the third parameter of the camera module of the third product 10. The camera module of the third product 10 faces the first detection member B, and the first detection member B detects the second parameter of the camera module of the third product 10.

After the above detection is completed, the turntable 22 rotates about 60 degrees for the fourth time, and a fifth product 10 to be tested is placed on the fifth fixing component on the turntable 22. The first detection member A detects the first parameter of the camera module of the fifth product 10. At this time, the camera module of the first product 10 faces the first detection member E, and the first detection member E detects the fifth parameter of the camera module of the first product 10. Also, the camera module of the second product 10 faces the first detection member D, and the first detection member D detects the fourth parameter of the camera module of the second product 10. The camera module of the third product 10 faces the first detection member C, and the first detection member C detects the third parameter of the camera module of the third product 10. The camera module of the fourth product 10 faces the first detection member B, and the first detection member B detects the second parameter of the camera module of the fourth product 10.

After the above detection is completed, the turntable 22 rotates about 60 degrees for the fifth time, and a sixth product 10 to be tested is placed on the sixth fixing component on the turntable 22. The first detection member A detects the first parameter of the camera module of the sixth product 10. At this time, the camera module of the first product 10 faces the first detection member F, and the first detection member F detects the sixth parameter of the camera module of the first product 10. Also, the camera module of the second product 10 faces the first detection member E, and the first detection member E detects the fifth parameter of the camera module of the second product 10. The camera module of the third product 10 faces the first detection member D, and the first detection member D detects the fourth parameter of the camera module of the third product 10. The camera module of the fourth product 10 faces the first detection member C, and the first detection member C detects the third parameter of the camera module of the fourth product 10. The camera module of the fourth product 10 faces the first detection member B, and the first detection member B detects the second parameter of the camera module of the fourth product 10.

After the above detection is completed, the turntable 22 rotates about 60 degrees for the sixth time, and the first product 10 faces the first detection member A, which completes the entire detection process. At this time, the first product 10 is rotated by the rotation assembly 40 and then detected by the second detection assembly 30.

Referring to FIGS. 1 and 2, in at least one embodiment, the second detection assembly 30 includes a second platform 31, a fixing table 32, and a second detection member 33. The second platform 31 is located on one side of the first platform 21. The fixing table 32 and the second detection member 33 are all connected to the second platform 31, and opposite to each other in a thickness direction of the second platform 31 (that is, the vertical direction shown in FIG. 2). The fixing table 32 is located on the second platform 31. The second detection member 33 may be partially embedded in the second platform 31. The fixing table 32 is provided with at least one second detection position 321. Each of the second detection positions 321 is used to support the first surface 101 to cause the camera module to face the second detection member 33. In at least one embodiment, each of the second detection member 33 may include a light source for emitting light toward the camera module.

In at least one embodiment, four second detection positions 321 are included on the fixing table 32, so the detection efficiency can be improved. The four second detection positions 321 are spaced from each other. In at least one embodiment, the four second detection positions 321 are arranged in a row. In another embodiment, the four second detection positions 321 may also be arranged in a 2×2 matrix, which can facilitate the maintenance. The number of the second detection positions 321 may also be varied to be five, six, and so on. A fixing component (not shown) may be arranged on each second detection position 321 to fix the product 10 on the second detection position 321, thereby keeping the camera module toward the second detection member 33.

The second detection member 33 is used to detect a seventh parameter of the camera module of the product 10. The seventh parameter may be related to the long-range focusing detection. The fixing table 32 and the second platform 31 may be transparent, and the second detection member 33 detects the camera module located on the second detection position 321 through the fixing table 32 and the second platform 31. In at least one embodiment, the fixing table 32 and the second platform 31 are made of glass. Since the second detection member 33 is partially embedded in the second platform 31, the space occupied by the second detection member 33 can be reduced. In other embodiments, the fixing table 32 may define a through hole, which allows the second detection member 33 to detect the camera module located on the second detection position 321.

In at least one embodiment, an end of the second detection member 33 further extends into the first platform 21. In the vertical direction Z, an orthogonal projection of the second detection member 33 partially overlaps with an orthogonal projection of the first platform 21. Thus, the space occupied by the second detection member 33 can further be improved.

The rotation assembly 40 includes a first grabbing member 41, a first rotation member 42, and a second grabbing member 43. The first grabbing member 41 is used to grab the product 10 that has been detected by the first detection members 23. The first rotation member 42 is connected to the second platform 31. The first rotation member 42 is used to receive the product 10 grabbed by the first grabbing member 41, and rotate the product 10 by 180 degrees to cause the first surface 101 to face the second platform 31. The second grabbing member 43 may be located between the first rotation member 42 and the second detection assembly 30. The second grabbing member 43 is used to grab the rotated product 10 to the second detection position 321. The first grabbing member 41 and the second grabbing member 43 can improve the transferring efficiency of the product 10 from the first detection assembly 20 to the second detection assembly 30. In at least one embodiment, each of the first grabbing member 41 and the second grabbing member 43 may be a robot arm. The first rotation member 42 may include a rotation shaft and a main body rotatably connected to the rotation shaft. In other embodiments, the first rotation member 42 may rotate the product 10 about any angle between 0 degree and 360 degrees to finish the detection of the camera module of product 10 at different angles.

The rotation assembly 40 may further include a second rotation member 44 connected to the second platform 31. The second rotation member 44 is used to receive the product 10 that has been detected by the second detection member 33, and rotate the product 10 again about 180 degrees to cause the second surface 102 to face the second platform 31. As such, the product 10 can return to its original state, so as to facilitate a subsequent unloading of the product 10. In at least one embodiment, the second rotation member 44 may include a rotation shaft and a main body rotatably connected to the rotation shaft. In other embodiments, the second rotation member 44 may rotate the product 10 about any angle between 0 degree and 360 degrees to meet the subsequent unloading need.

The rotation assembly 40 may further include a transmission member 45. The transmission member 45 is connected between the first platform 21 and the second platform 31. The transmission member 45 is used to receive the product 10 grabbed by the first grabbing member 41 and transfer the product 10 to the first rotation member 42, so that the first rotation member 42 can rotate the product 10. The transmission member 45 is further used to move the rotated product 10 out of the rotation assembly 40. The transmission member 45 can transmit the product 10 to the corresponding destination even when the moving distance of the first grabbing member 41 or the second grabbing member 43 is limited. In at least one embodiment, the transmission member 45 may be a conveyor belt.

Referring to FIGS. 1 and 2, in at least one embodiment, the detection device 100 further includes a transfer member 50. The transfer member 50 is located on another side of the first platform 21. The transfer member 50 includes a third platform 51, a loading member 52, and an unloading member 53. The loading member 52 and the unloading member 53 are all connected to the third platform 51. The loading member 52 is used to provide the product 10 to be tested to the first detection assembly 20. The first grabbing member 41 is located between the second platform 31 and the third platform 51. The first grabbing member 41 is further used to grab the product 10 that has been detected by the second detection member 23 and rotated by the second rotation member 44, and place the product 10 to the unloading member 53. The unloading member 53 is used to receive the product 10 that has been detected by the first detection members 23 and the second detection member 33. Thus, the product 10 can be automatically loaded or unloaded.

In at least one embodiment, each two of the first platform 21, the second platform 31, and the third platform 51 are spaced from each other. As such, the vibration generated by the rotation assembly 40 can be prevented from transmitting to the first detection assembly 20 and the second detection assembly 30, thereby preventing the detection result of the camera module from being affected by such vibration. In at least one embodiment, each of the loading member 52 and the unloading member 53 may be a conveyor belt.

The transfer member 50 further includes a third grabbing member 54 connected to the third platform 51. The third grabbing member 54 is used to grab the product 10 from the loading member 52 to the first detection position 221, thereby improving the loading efficiency of the product 10. In at least one embodiment, the third grabbing member 54 may be a robot arm.

The unloading member 53 includes a qualified portion 531 and an unqualified portion 532. The qualified portion 531 is used to receive the product 10 that has passed the detection by each of the first detection members 23 and the second detection member 33. The unqualified portion 532 is used to receive the product 10 that has failed in the detection of at least one of the first detection members 23 and the second detection member 33. As such, a confusion of different products 10 during the unloading process can be avoided.

Furthermore, the unloading member 53 may further include a redetection portion 533. When any product 10 has fails in the detection of at least one of the first detection members 32 and the second detection member 33, the redetection portion 533 is used to receive the product 10. The redetection portion 533 is further used to cooperate with the third grabbing member 54, the first detection assembly 20, the rotation assembly 40, and the second detection assembly 30, thereby moving the product 10 to the first detection assembly 20 and the second detection assembly 30 for further detection. As such, the product 10 is prevented from being misjudged as unqualified due to errors happened in the first detection member 23 or the second detection member 33.

When the product 10 has been detected as unqualified by the first detection member 23, the first grabbing member 41 grabs the product 10 from the first detection assembly 20 to the redetection portion 533, and the third grabbing member 54 grabs the product 10 from the redetection portion 533 again to the first detection position 221 for further detection. If the product 10 passes the redetection by the first detection member 23, the product 10 is then moved to the rotation assembly 40 and the second detection assembly 30 for further detection. If the product 10 still fails in the detection by the first testing mechanism 23, the first grabbing member 41 directly grabs the product 10 to the unqualified portion 532.

When the product 10 has been detected as qualified by the first detection member 23 but unqualified by the second detection member 33, the first grabbing member 41 grabs the product 10 that has been rotated by the second rotation member 44 to the redetection portion 533. The third grabbing member 54 grabs the product 10 on the redetection portion 533 again to the first detection position 221 for further detection. If the product 10 passes the redetection by both of the first detection member 23 and the second detection member 33, the first grabbing member 41 grabs the product 10 to the quality portion 531. If the product 10 still fails in the detection by the second testing mechanism 33, the first grabbing member 41 directly grabs the product 10 to the unqualified portion 532.

The transfer member 50 may further include an empty portion 55 for storing an empty tray. The empty material tray is used to receive the product 10.

In at least one embodiment, the detection device 100 further includes a scanning mechanism 60. The scanning mechanism 60 is connected to the third grabbing member 54, and used to scan an identification information of the product 10 grabbed by the third grabbing member 54 from the loading portion 531 or the redetection portion 533. The product 10 is attached with a barcode (not shown), which includes the identification information of the product 10. The scanning mechanism 60 may be a scanning gun.

With the above configuration, the product 10 is first placed on one of the first detection positions 221. After being detected at the first detection position 221, the turntable 22 rotates the product 10 to the next first detection position 221 to perform the next detection. After the product 10 has been detected by the first detection member 23, the product 10 is rotated by the rotation assembly 40 and placed on the second detection position 321. Then, the product 10 is detected by the second detection member 33. The rotation assembly 40 can meet the detection requirements for the product to under different orientations of the camera module. Furthermore, since the first detection assembly 20 and the second detection assembly 30 are independent from each other, the detection efficiency is improved.

Figure 3:
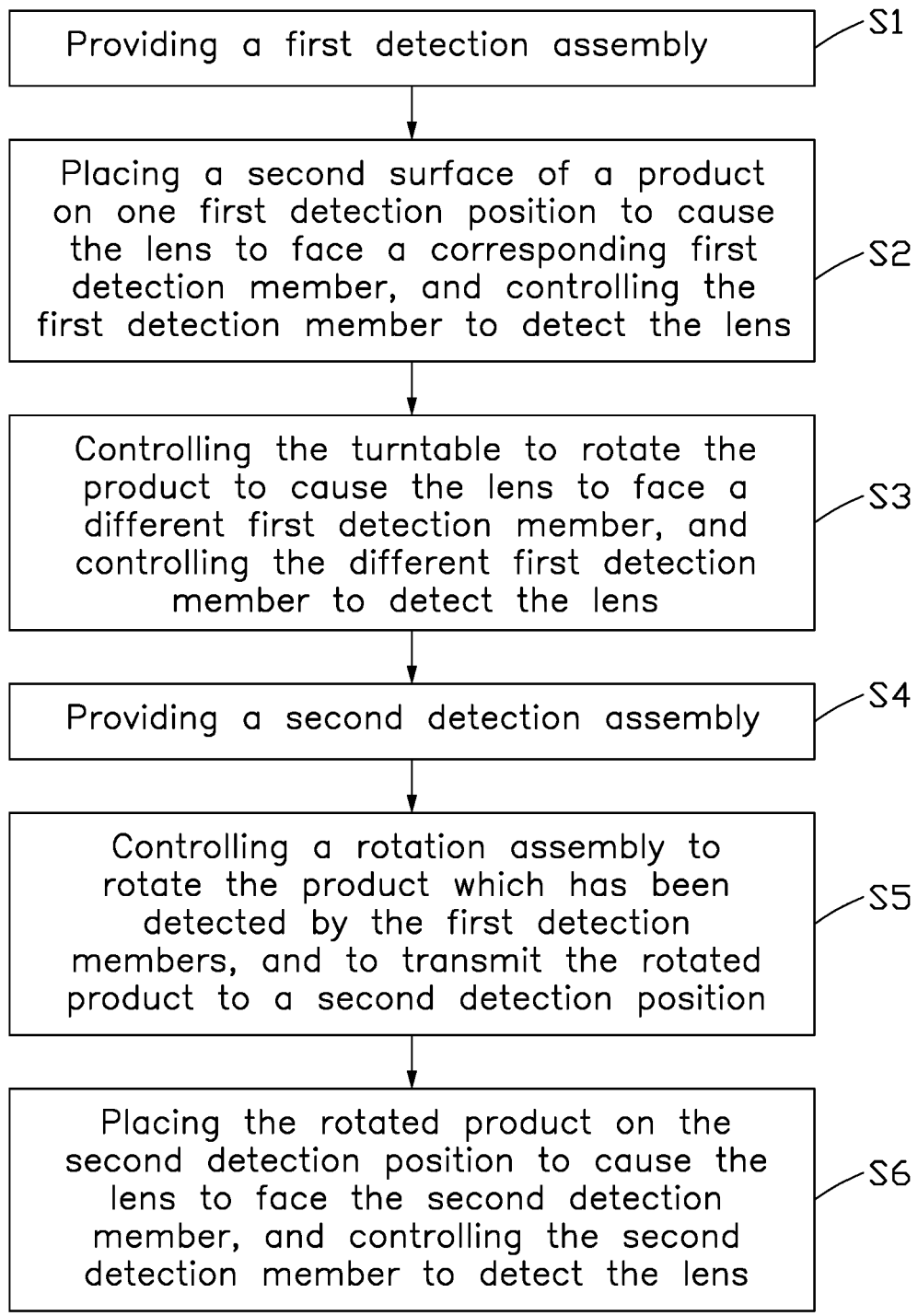
FIG. 3 is a flowchart of a detection method according to an embodiment of the present disclosure.

Referring to FIG. 3, a detection method is presented in accordance with an embodiment. The detection method is provided by way of example, as there are a variety of ways to carry out the method. The detection method can begin at block S1.

S1, a first detection assembly is provided. The first detection assembly includes a first platform, a turntable, and a plurality of first detection members. The turntable rotatably is connected to the first platform and provided with a plurality of first detection positions. The first detection members are connected to the first platform and surround the turntable.

S2, the second surface of the product is placed on one of the first detection positions to cause the camera module to face a corresponding one of the first detection members. Then, the corresponding one of the first detection members is controlled to detect the camera module.

S3, the turntable is controlled to rotate the product to cause the camera module to face a different one of the first detection members. Then, the different one of the first detection members is controlled to detect the camera module.

S4, a second detection assembly is provided. The second detection assembly includes a second platform, a fixing table, and a second detection member. The second platform is located on one side of the first platform. The fixing table and the second detection member are connected to the second platform. The fixing table is provided with a second detection position.

S5, the rotation assembly is controlled to rotate the product which has been detected by the plurality of first detection members, and to transmit the rotated product to the second detection position.

S6, the rotated product is placed on the second detection position to cause the camera module to face the second detection member. Then, the second detection member is controlled to detect the camera module.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A detection device for detecting a camera module of a product, the product comprising a first surface for exposing the camera module and a second surface opposite to the first surface, the detection device comprising:
  a first detection assembly comprising a first platform, a turntable, and a plurality of first detection members, the turntable rotatably connected to the first platform and provided with a plurality of first detection positions, the plurality of first detection members connected to the first platform and surrounding the turntable, each of the plurality of first detection positions configured to support the second surface of the product to cause the camera module to face a corresponding one of the plurality of first detection members, the turntable configured to rotate the product to cause the camera module to face a different one of the plurality of first detection members, and each of the plurality of first detection members configured to detect the camera module;
  a second detection assembly comprising a second platform, a fixing table, and a second detection member, the second platform located on one side of the first platform, the fixing table and the second detection member connected to the second platform, the fixing table provided with a second detection position, the second detection position configured to support the first surface of the product to cause the camera module to face the second detection member, and the second detection member configured to detect the camera module;
  a rotation assembly located between the first detection assembly and the second detection assembly, the rotation assembly configured to receive the product which has been detected by the plurality of first detection members, rotate the product by 180 degrees, and transmit the rotated product to the second detection position;
  wherein the rotation assembly comprises a first grabbing member, a first rotation member, and a second grabbing member, the first grabbing member is configured to grab the product which has been detected by the plurality of first detection members, the first rotation member is configured to rotate the product received by the first grabbing member to cause the first surface to face the second platform, the second grabbing member is configured to grab the rotated product onto the second detection position.

2. The detection device according to claim 1, wherein adjacent two of the plurality of first detection positions are spaced from each other by a same distance around an axis of the turntable, adjacent two of the plurality of first detection members are spaced from each other by a same distance around the axis, and the plurality of first detection positions correspond to the plurality of first detection members.

3. The detection device according to claim 1, wherein the fixing table is located on the second platform, and the second detection member is embedded in the second platform and faces the fixing table.

4. The detection device according to claim 3, wherein an end of the second detection member further extends into the first platform.

5. The detection device according to claim 3, wherein the second platform and the fixing table are transparent layer, and the second detection member is configured to detect the camera module located on the second detection position through the second platform and the fixing table.

6. The detection device according to claim 1, wherein the second grabbing member is located between the first rotation member and the second detection assembly.

7. The detection device according to claim 1, wherein the rotation assembly further comprises a second rotation member connected to the second platform, the second rotation member is configured to receive the product which has been detected by the second detection member, and rotate the product to cause the second surface to face the second platform.

8. The detection device according to claim 7, wherein the rotation assembly further comprises a transmission member connected between the first platform and the second platform, the transmission member is configured to receive the product grabbed by the first grabbing member and transfer the product to the first rotation member, and the transmission member is further configured to move the rotated product from the second rotation member out of the rotation assembly.

9. The detection device according to claim 8, further comprising a transfer member located on another side of the first platform, wherein the transfer member comprises a third platform, a loading member, and an unloading member, the loading member and the unloading member are connected to the third platform, the loading member is configured to provide the product to the first detection assembly, the unloading member is configured to receive the product which has been detected by the plurality of first detection members and the second detection member, the first grabbing member is further configured to grab the rotated product from the second rotation member onto the unloading member.

10. The detection device according to claim 9, wherein the transfer member further comprises a third grabbing member connected to the third platform, and the third grabbing member is configured to grab the product from the loading member onto one of the plurality of first detection positions.

11. The detection device according to claim 10, further comprising a scanning mechanism, wherein the scanning mechanism is connected to the third grabbing member, and is configured to scan an identification information of the product grabbed by the third grabbing member.

12. The detection device according to claim 9, wherein each two of the first platform, the second platform, and the third platform are spaced from each other.

13. The detection device according to claim 9, wherein the unloading member comprises a qualified portion and an unqualified portion, the qualified portion is configured to receive the product which has passed the detection by each of the plurality of first detection members and the second detection member, and the unqualified portion is configured to receive the product which that has failed in the detection of at least one of the plurality of first detection members and the second detection member.

14. The detection device according to claim 9, wherein the unloading member comprises a redetection portion, the redetection portion is configured to receive the product which that has failed in the detection of at least one of the plurality of first detection members and the second detection member, the first grabbing member is further configured to grab the product from the redetection portion to one of the plurality of first detection positions.

15. The detection device according to claim 1, wherein the plurality of first detection members is configured to detect different parameters of the camera module.

16. The detection device according to claim 1, wherein one of the plurality of first detection members is configured to detect a parameter related to a close-range focusing detection, and the second detection member is configured to detect a parameter related to a long-range focusing detection.

17. A detection method for detecting a camera module of a product, the product comprising a first surface for exposing the camera module and a second surface opposite to the first surface, the detection method comprising:
providing a first detection assembly, which comprises a first platform, a turntable, and a plurality of first detection members, wherein the turntable rotatably is connected to the first platform and provided with a plurality of first detection positions, the plurality of first detection members is connected to the first platform and surrounding the turntable;
placing the second surface of the product on one of the plurality of first detection positions to cause the camera module to face a corresponding one of the plurality of first detection members, and controlling the corresponding one of the plurality of first detection members to detect the camera module;
controlling the turntable to rotate the product to cause the camera module to face a different one of the plurality of first detection members, and controlling the different one of the plurality of first detection members to detect the camera module;
providing a second detection assembly, which comprises a second platform, a fixing table, and a second detection member, wherein the second platform is located on one side of the first platform, the fixing table and the second detection member are connected to the second platform, the fixing table is provided with a second detection position; and
controlling a rotation assembly to rotate the product which has been detected by the plurality of first detection members by 180 degrees, and to transmit the rotated product to the second detection position;
placing the rotated product on the second detection position to cause the camera module to face the second detection member, and controlling the second detection member to detect the camera module;

wherein the rotation assembly comprises a first grabbing member, a first rotation member, and a second grabbing member, the first grabbing member is configured to grab the product which has been detected by the plurality of first detection members, the first rotation member is configured to rotate the product received by the first grabbing member to cause the first surface to face the second platform, the second grabbing member is configured to grab the rotated product onto the second detection position.

18. The detection method of claim 17, wherein after rotating the product, the detection method further comprises:
   placing another product on a next one of the of the plurality of first detection members along a rotation direction of the turntable.

* * * * *